June 7, 1927.
J. H. MONTSTREAM
CUTTING TOOL
Filed March 1, 1923
1,631,641
2 Sheets-Sheet 1
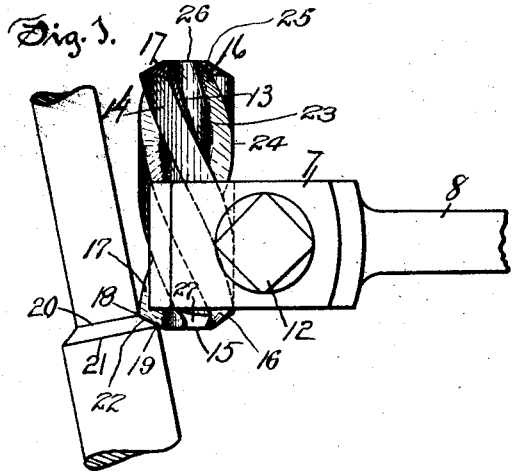
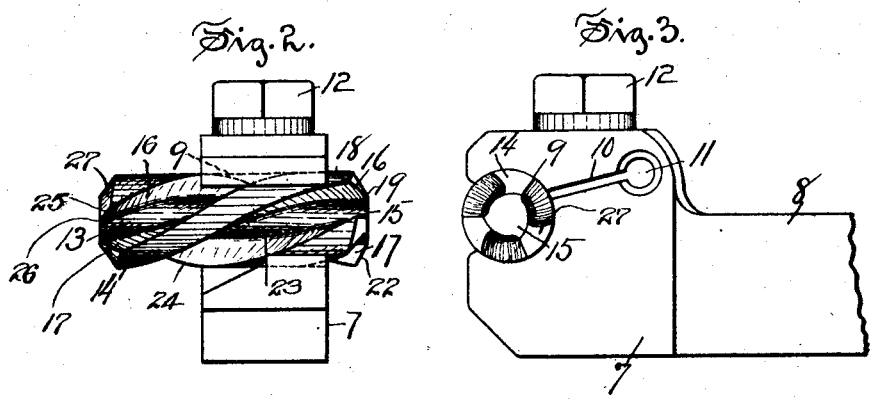
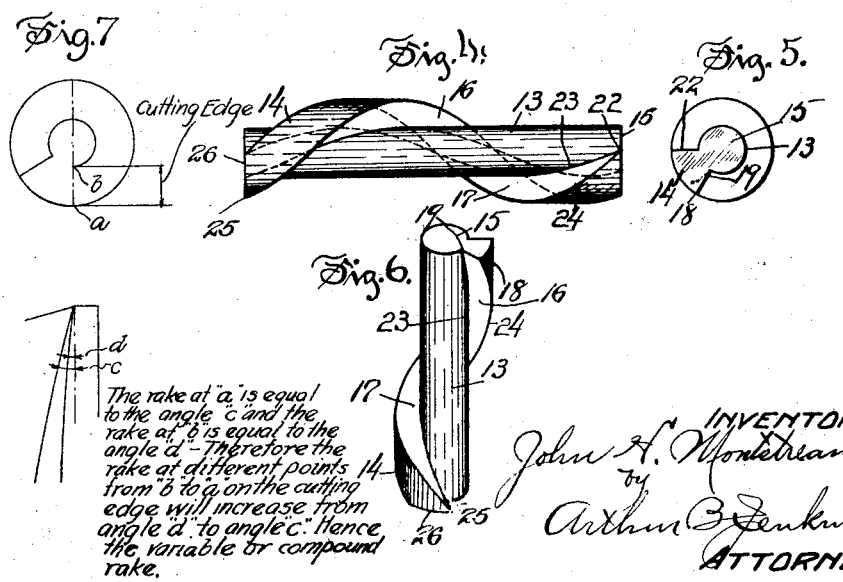
The rake at "a" is equal to the angle "c" and the rake at "b" is equal to the angle "d." Therefore the rake at different points from "b" to "a" on the cutting edge will increase from angle "d" to angle "c." Hence the variable or compound rake.
INVENTOR
John H. Montstream
by
Arthur B. Jenkins.
ATTORNEY June 7, 1927.
J. H. MONTSTREAM
CUTTING TOOL
Filed March 1, 1923
1,631,641
2 Sheets-Sheet 2
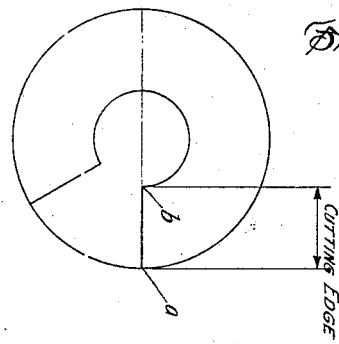
Fig. 7.
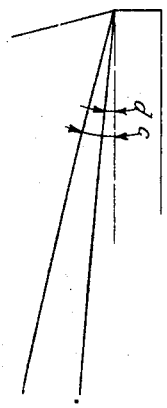
The rake at "a" is equal to the angle "c" and the rake at "b" is equal to the angle "d" - therefore the rake at different points from "b" to "a" on the cutting edge will increase from angle "d" to angle "c" hence the variable or compound rake
INVENTOR
John H. Montstream
by
Arthur B. Jenkins,
ATTORNEY Patented June 7, 1927.

1,631,641

UNITED STATES PATENT OFFICE.

JOHN H. MONTSTREAM, OF HARTFORD, CONNECTICUT.

CUTTING TOOL.

Application filed March 1, 1923. Serial No. 622,231.

My invention relates to the class of cutting tools that are more commonly employed in connection with lathes in which the tool is held stationary while the work is moved in contact with the cutting edge, and an object of my invention, among others, is to provide a cutting tool that shall have a maximum efficiency both as to the rapidity of cutting action and also as to the finished character of its work; and a further object of the invention is to provide a tool that shall require little skill in grinding, and also one that shall require a minimum number of grinding operations to perform a certain amount of work.

One form of device embodying my invention and in the construction and use of which the objects herein set out, as well as others, may be attained, is illustrated in the accompanying drawings, in which—

Figure 1 is a top view of a portion of a tool holder having my improved cutting tool secured thereto and showing the manner of operation upon a piece of work.

Figure 2 is a view looking at the end of said tool holder with my improved cutting tool secured therein.

Figure 3 is a side view of said holder and cutting tool.

Figure 4 is an illustrative view showing the cutting tool provided with a single cutting rib.

Figure 5 is an end view of the same.

Figure 6 is a view similar to Figure 4, but looking at the tool from a different point of view.

My invention illustrated and described herein provides a tool with a chip deflecting surface of such form and position that the minimum deflection of the severed chip occurs at one edge of the chip and the maximum deflection at the other edge and between the two edges of the chip the deflective action of said surface varies gradually between the maximum and the minimum. The chip deflecting surface commonly called the top surface on a cutting tool, has therefore on my tool a variable angle of rake, or, simply, a variable rake. The angle of rake and the helical angle, as usually defined, are complements and together equal to a right angle or ninety degrees. The angle between the direction of feed of the tool and an element of the chip deflecting surface is the rake of that particular element. Where the rake is large the deflection of the chip is small and the angle of the cutting lip edge is acute and piercing. Where the rake is small the deflection of the chip is large and this larger deflection strains, stretches and partially disrupts the material that is in front of or in touch with the cutting edge, weakening it and thus facilitating the cutting or piercing action of the cutting edge. In short, my object has been to produce a tool with a varying rake along the cutting edge.

The effects of such compound rake are most marked. In cutting soft steel, for instance, I use thirty to forty degrees rake at the outermost end of the cutting edge, this rake running down to about one-half or to fifteen or twenty degrees, at the inward end of the edge. In taking a wide, stout chip and running the work at high speed the chip rolls off rearward and downward taking a cork-screw shape and the work speed must be very high indeed to make the chip turn a color. Using a common lathe tool with constant rake and shaped-up with good judgment as to rake and form the chip would turn blue before the work speed referred to above obtains. A rather novel circumstance is that I use the very same tool for cutting cast iron as I do for steel with satisfactory results.

With my improved cutting tool after the form of the chip deflecting surface has been established this form stays permanent through the life of the tool, unaffected by upkeeps.

My improved tool embodies a rib or ribs that make up the tool-bit, each rib with two chip deflecting surfaces and two cutting edges, one at each end on each separate rib. On a bit made up of three such ribs there are six cutting edges. When one of these cutting edges gets dull a fresh one is turned up in its place. For instance: a plural ribbed tool-bit of a certain length contains an effective cutting element of a length equal to the number of ribs multiplied by the length of the tool plus the extra lengths of the combined ribs due to their spiral form. As this stands a thousand dressings during its life it will last for years, thus effecting a great economy in tool steel.

My improved tool also provides a device of such a shape and with such a position in relation to the work that the chip is deflected and guided downward and rearward relatively to the direction of the feed and out of the way, instead of piling up in a twisted mass above, entangling the tool and the work.

In the accompanying drawings the numeral 7 indicates a tool holder having a shank 8 for securing the holder, as in a tool post, a socket 9 being provided to receive and hold the tool. A slot 10 is cut from the socket 9 into a hole 11 formed through the holder 7 and a screw 12 is employed to contract the socket 9 thereby holding the tool therein.

My improved cutting tool comprises a body 13 forming the core of the tool and from which ribs 14 project. Each one of these ribs is bound by two chip deflecting surfaces 16—17 of helical or spiral form, and two cutting edges, one 22 upon one surface 17 at one end 15 of each rib, and the other 25 upon the other surface 16 at the other end 26 of the rib. These chip deflecting surfaces are straight from the inner edge, next to the body 13, to the outer edge thereof and the cutting edge is, therefore, straight. The body 13 is interposed between and separates each of the ribs, there, therefore, being a distinct and considerable space between such ribs.

Due to the helical form of the chip deflecting surfaces the outermost element 24 of this surface has the largest rake and there the cutting lip is acute and the innermost element 23 has the smallest rake and there the cutting lip is proportionally less acute and between the outermost and innermost surface elements and across the chip deflecting surface the rake changes and grows gradually out of one magnitude and into conformity with the other.

The tool and the work in Figure 1 lay approximately side by side and the axis of the tool and the work and the cutting edge lay approximately in one plane. In this position the various elements of the tool take proper action with the work.

The situation is such that while the more acute, more frail, weaker and less supported portion 18 (see Figures 1, 2 and 6) of the tool, with less heat conductive capacity also, is engaged with a portion 20 of the work that passes by with less speed, the inner portion 19 of the tool that is less acute and stouter and better supported and with more body and better qualified to stand the harder and faster cut, is engaged with that portion of the work 21 that passes by with highest speed. The duty and ability to carry the same are balanced up along the cutting edge. The outer and keenest portion of the cutting lip leaves a smooth finish on the work.

The breadth and thickness of the chip and also the action of the chip deflecting surface may be varied advantageously sometimes by turning the tool more or less away, out of parallelism with the work, but under most ordinary conditions substantially the relative positions of the tool and work shown herein will be found to produce satisfactory results.

It will be noticed in Figure 1 that the end or clearance surface on each one of the ribs is ground on an angular chamfer 27 for the purpose that, when one cutting edge is being sharpened, the adjacent lip below may not come in contact with the grinding wheel. The angle of this chamfer is preferably about twenty-five degrees in the tool shown and the grooves between the ribs have such a form that the cutting edge becomes straight and radial, pointing approximately to the axis of the tool, and delivers a flat chip which is the easiest one to cut, deflect and distort.

The helical portions of a tool may have a varying lead or an increasing or decreasing twist. In such case the chip deflecting surfaces will be different in rake at opposite ends of the tool and a choice between the two is desirable when working different metals or meeting different characteristics in one and the same metal.

A similar advantage may be had by providing a tool but with one helical groove with its particular but constant lead and another groove with a different but also constant lead. In this case the ends of the tool will be equal to each other and each end will have two cutting lips different from each other in rake.

Many combinations of this character may be had by combining chip deflecting surfaces of helical formation and of various leads, either constant or variable.

In accordance with the provisions of the patent statutes I have described the principles of operation of my invention, together with the device which I now consider to represent the best embodiment thereof; but I desire to have it understood that the device shown is only illustrative, and that the invention may be carried out by other means and applied to uses other than those above set out.

I claim—

1. A cutting tool comprising a body, a rib extending spirally about said body, and a cutting edge forming the cutting extremity of said rib and straight from its inner to its outer edge, said cutting edge being formed with an angle gradually varying in in degree along said edge from one end to the other thereof.

2. A cutting tool comprising a body, a rib extending spirally about said body, and a cutting edge forming the cutting extremity of said rib and straight from its inner to its outer edge, said cutting edge gradually varying in a fixed ratio from an angle of a certain degree at its outer end to a more obtuse angle at its inner end.

3. A cutting tool comprising a body, a plurality of ribs extending spirally about said body, and a cutting edge forming the cutting extremity of each rib and straight from its inner to its outer edge, each cutting edge being formed with an angle gradually varying in degree from one end to the other of said edge.

4. A cutting tool comprising a body, a rib extending spirally about said body, and a cutting edge formed on opposite sides of said rib and straight from its inner to its outer edge, said rib comprising the cutting extremity of said rib, each cutting edge varying in a fixed ratio from an angle of a certain degree at its outer end to a more obtuse angle at its inner end.

5. A cutting tool comprising a body, a rib extending spirally about said body and having a cutting edge forming the cutting extremity thereof, said rib being straight from its inner to its outer edge and said cutting edge being partially formed by a chip deflecting surface and having an angle gradually varying in degree along said edge from one end to the other thereof.

6. A cutting tool comprising a body, a rib extending spirally about said body and having a chip deflecting surface formed at an angle with and projecting from said body, and a cutting edge forming the cutting extremity of said rib and gradually varying in degree along said edge.

7. A cutting tool comprising a body, a plurality of ribs extending spirally about said body and spaced apart thereon, each rib having a chip deflecting surface extending in the direction of depth of the rib from the outer edge to said body, and a cutting edge forming the cutting extremity of said rib and gradually varying in degree along said edge.

8. A cutting tool comprising a body generally round in cross section, a plurality of ribs extending spirally about said body and separated one from another by the surface of said body, each of said ribs having a cutting extremity gradually varying in degree along said edge.

JOHN H. MONTSTREAM.